United States Patent [19]

Fernquist et al.

[11] 4,155,340
[45] May 22, 1979

[54] SOLID STATE IGNITION SYSTEM

[75] Inventors: James F. Fernquist, Farmington; James C. Byrne, Farmington Hills, both of Mich.

[73] Assignee: Gulf & Western Manufacturing Company, Southfield, Mich.

[21] Appl. No.: 781,743

[22] Filed: Mar. 28, 1977

[51] Int. Cl.² ............................................. F02P 3/06
[52] U.S. Cl. ........................... 123/148 CC; 123/148 E
[58] Field of Search .......... 123/146.5, 148 CC, 148 E

[56] References Cited

U.S. PATENT DOCUMENTS

| | | | |
|---|---|---|---|
| 2,924,633 | 2/1960 | Sichling et al. | 123/148 E |
| 3,373,729 | 3/1968 | Lemen | 123/148 E |
| 3,405,347 | 10/1968 | Swift et al. | 123/148 CC |
| 3,667,441 | 6/1972 | Cavil | 123/148 CC |
| 3,923,030 | 12/1975 | Luteran | 123/148 E |

Primary Examiner—Verlin R. Pendegrass
Assistant Examiner—S. A. Cangialosi
Attorney, Agent, or Firm—Meyer, Tilberry & Body

[57] ABSTRACT

A device for creating a sparking voltage across the electrodes of a spark plug of an internal combustion engine comprising a rotatable member carrying a permanent magnet having an outwardly extending flux field movable in an annular path, a transformer having a first winding for creating a current change of a spark creating level and a second winding connected across the electrodes, a Hall Effect switch activated by a D.C. biasing voltage and having an output energized when the switch is exposed to a flux field, switching means for rapidly changing current flow in the first winding only when the switching means is actuated, means for actuating the switching means when the output of the Hall Effect switch is energized, and means for mounting the Hall Effect switch at a selected location where the switch is exposed to an actuating flux from the rotating permanent magnets when the rotating member is at a selected angular position. In accordance with another feature, the D.C. biasing voltage is varied directly with the speed of the rotating member to provide a spark advance-retard feature, especially useful in an energy discharge ignition system.

16 Claims, 24 Drawing Figures

FIG. 6
(FIRING POSITION)

FIG. 15
NON-REGULATED HALL EFFECT SWITCH

THRESHOLD FLUX (OPERATE POINT)

APPLIED BIASING VOLTAGE DECREASING →

FIG. 16

SPEED RESPONSIVE

FIG. 17

SPEED RESPONSIVE BELOW $V_2$

SOLID STATE IGNITION SYSTEM

The present invention relates to an ignition system for an internal combustion engine and more particularly to a solid state ignition system. Certain features of the invention are useful and advantageous in a magneto ignition system.

The present invention is particularly applicable for use in the ignition system of a single cylinder internal combustion engine of the type used in power saws, power mowers, and the like and it will be described with particular reference thereto; however, it is appreciated that the invention has broader applications and may be used in various ignition systems for internal combustion engines.

BACKGROUND OF INVENTION

Small internal combustion driven implements, such as power saws, are becoming quite popular and are produced in great volumes. One of the primary features which affects consumer acceptance of such product is its ability to start repeatedly and operate effectively over wide variations in speed. Thus, the ignition system for the internal combustion engine which is used for these devices must be durable, effective in operation over a wide range of speed and uniform in operation over a number of years. In the past, the ignition system for a single cylinder internal combustion engine of the type used for small power implements has been patterned after the normal ignition system of a motor vehicle. In that instance, a cam operated switch, known as points, was used to break the ignition coil primary winding to induce a sparking current at the output of the ignition coil secondary winding. Such points caused variations in the timing of the spark with respect to the movement of the piston within the cylinder. Also, such contacts or points are spark eroded and the operating block for the points wears extensively to require periodic maintenance and replacement.

In small engines of the type contemplated in the preferred embodiment of one aspect of the invention, the sparking current is created by a magneto which involves a rotating flywheel having permanent magnets with an outwardly extending flux field that moves in an annular path as the flywheel is rotated by the crankshaft of the engine. This rotating flux field induces a voltage in the primary of the ignition coil which creates a current that changes rapidly upon operation of the points to induce a high voltage in the secondary windings for use in sparking the spaced electrodes of the spark plug. One aspect of the present invention relates to an ignition system which is usable with an internal combustion engine having a magneto for creating the sparking voltage. A system in accordance with this aspect of the present invention removes the need for mechanical switching and provides a solid state ignition system for a magneto operated sparking arrangement for an internal combustion engine. In accordance with the preferred embodiment of this aspect of the invention, a cartridge can be used with a standard magneto ignition system to convert the system from mechanical switching to solid state operation.

Although solid state ignition systems have been used in certain internal combustion engines, such systems have not been developed commercially for use on magneto operated ignition systems. Also, solid state ignition systems often require complex expensive components for producing sparking voltages.

THE INVENTION

In accordance with the first aspect of the present invention, there is provided an improvement in an ignition system of the magneto type wherein a member, such as a flywheel, is rotated about an axis and carries a permanent magnet having an outwardly extending flux field to create a flux field rotating in a given annular path concentric with the axis. In this type of system, the flux field has a given flux intensity at a selected location spaced from the rotating member and in the annular path when the member is at a selected angular position. Such a magneto system includes a circuit for creating a sparking voltage upon rapid change in current in at least a portion of the circuit and switching means for causing this rapid change in current upon actuation of the switching means. An improvement of the present invention is the provision of a Hall Effect switch activated by a D.C. biasing voltage and having a switchable output and an operate point flux above which the switchable output is shifted from a first electrical condition to a second electrical condition. This operate point flux corresponds to the given flux intensity set forth in the above general description of a magneto system. Means are provided for actuating the switching means by the second electrical condition at the output of the Hall Effect switch and coil means for creating the D.C. biasing voltage upon exposure of the coil means to the rotating magnetic field. Further in accordance with this aspect of the invention, there is provided a first mounting means for mounting the coil adjacent the rotating member and in the annular path whereby the flux field causes the coil means to create the biasing voltage and a second mounting means for supporting the Hall Effect switch in the annular path and at the selected position set forth in the general description of the magneto system. In this manner, the rotating flux field of a standard magneto system provided D.C. biasing voltage for a Hall Effect switch and also actuates the Hall Effect switch at a selected angular position of the rotatable member. The rotating flux field also induces the sparking voltage into the ignition coil. Consequently, an integrated magneto system is obtained with the flux field of the flywheel providing various coordinated functions. The relative position of the ignition coil pickup and the Hall Effect switch gives the spark advance for the system. In a magneto system, the rotating member is driven by the crankshaft of the internal combustion engine. Thus, in accordance with the invention, the coil means and Hall Effect switch can be mounted together and adjacent the rotating flywheel while the ignition coil and core can be mounted in its normal relationship with the flywheel.

Another aspect of the present invention is particularly applicable to a capacitor discharge ignition system which can be controlled by the same type of flywheel used in a normal magneto system. In a magneto system wherein current flow is stopped at a preselected high level to give a rapid current change, the sparking point is generally fixed at a given angular position of the flywheel which corresponds to the high induced voltage in the ignition primary. Advancing or retarding of the spark is then accomplished by coordinating the relative angular position of the ignition coil and the flywheel magnetic system. In a discharge system, the stored energy is available for discharge at a variable angular position of the flywheel; therefore, the spark can be advanced or retarded without affecting the sparking feature of the ignition system. In this second inventive feature, voltage for the Hall Effect switch and this biasing circuit includes means for changing the level of the D.C. biasing voltage in a direct relationship to the angular speed of the rotating magnetic flux field, i.e. the flywheel in the preferred embodiment.

In accordance with a more limited aspect of the invention a coil means located in the path of the rotating flux field provides the speed responsive feature, in that a higher D.C. voltage is created by the coil means at higher flywheel speeds. Since a Hall Effect switch has a lesser value for its operate point flux as the D.C. biasing voltage increases, the variable voltage of the biasing circuit for the Hall Effect switch changes the angular position of the flywheel at which the Hall Effect switch is operated or toggled. Thus, at higher speeds a greater advance of the spark is created with respect to top dead center (TDC) of the piston in the combustion chamber. By using this characteristic of a Hall Effect switch, automatic advancing and retarding with respect to engine speed is obtainable by only modifying the D.C. biasing voltage in relationship to speed changes of the engine. Thus, mechanical advancing and retarding arrangements are not needed. In some Hall Effect switches there is an integrated input voltage regulating stage. To employ the speed responsive feature, the switch is made linear generally by removing the input voltage regulation.

If the ignition system is to have a firing or sparking point fixed with respect to top dead center (TDC) of the piston, which is generally true in a magneto system, the D.C. voltage directed to the Hall Effect switch from the biasing circuit is generally fixed. This can be accomplished by providing the biasing circuit with regulation components, such as an internal regulating stage of the switch or a capacitor and a parallel Zener diode having a value corresponding to the desired D.C. biasing voltage. The capacitor is used to store energy and the Zener diode is used to maintain the desired D.C. voltage value on the capacitor. In this arrangement, the operate point of the Hall Effect switch is fixed. Consequently, the firing or sparking point is fixed with respect to the rotation of the flywheel. This is generally used when a sparking voltage can be created only at a selected anuglar position of the flywheel, such as in a conventional magneto system. The speed responsive concept in accordance with the second aspect of the present invention may be incorporated in various ignition systems of the type employing the Hall Effect switch having the characteristic of allowing spark creation during at least a wide range of angular positions of the flywheel.

The primary object of the present invention is the provision of a ignition system for an internal combustion engine, which system employs no mechanical switching units for creating the sparking voltage.

Another object of the present invention is the provision of a magneto ignition system which system uses a standard Hall Effect switch for causing a sparking voltage at a preselected time in an engine cycle.

Still a further object of the present invention is the provision of a system as defined above, which system uses a Hall Effect switch and a biasing circuit for the switch, each of which is operated by a rotating flux field.

Another object of the present invention is the provision of a magneto ignition system, which system uses the same rotating magnetic flux field for creating a spark voltage level at a given position, for operating the switching action of a Hall Effect switch and for biasing the switch.

Still a further object of the present invention is the provision of a system as defined above, which system employs a replaceable attachment for converting somewhat standard magneto system components to a solid state operation.

Still a further object of the present invention is the provision of a solid state discharge ignition system, which system has an automatic spark advance feature using no levers or other mechanical adjusting mechanisms.

These and other objects and advantages will become apparent from the following description.

BRIEF DESCRIPTION OF DRAWINGS

In the specification, the following views are employed:

FIG. 18 is a flux graph illustrating certain characteristics of the magnets employed in the present invention;

FIG. 18A is a schematic graph illustrating the space relationship between the flywheel of FIG. 18 and the Hall Effect switch employed in creating a sparking voltage;

FIG. 19 is a view similar to FIG. 18 illustrating flux intensity lines for the magnets used on the flywheel and their relationship to the Hall Effect switch;

FIG. 20 is a schematic wiring diagram of a capacitive discharge ignition system using the second aspect of the present invention; and, FIG. 21 is a schematic wiring diagram of an inductive discharge ignition system using the second aspect of the present invention.

DESCRIPTION OF THE FIRST PREFERRED EMBODIMENT

Figure 1:
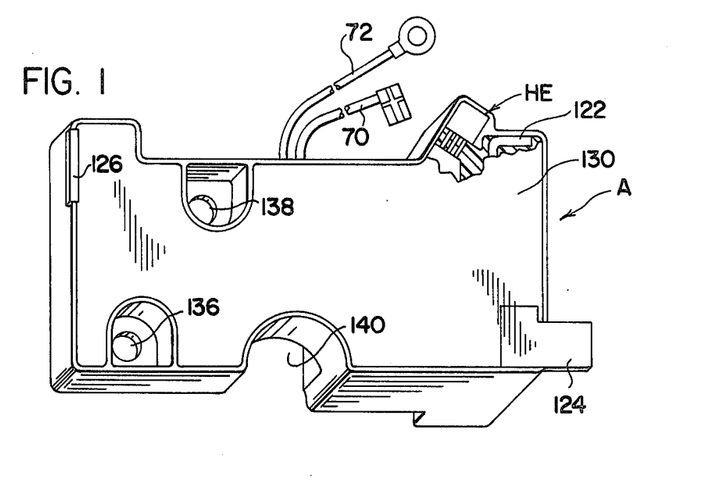
FIG. 1 is a pictorial view illustrating the attachment or cartridge for converting a standard magneto ignition system into a novel solid state magneto ignition system.
Figure 2:
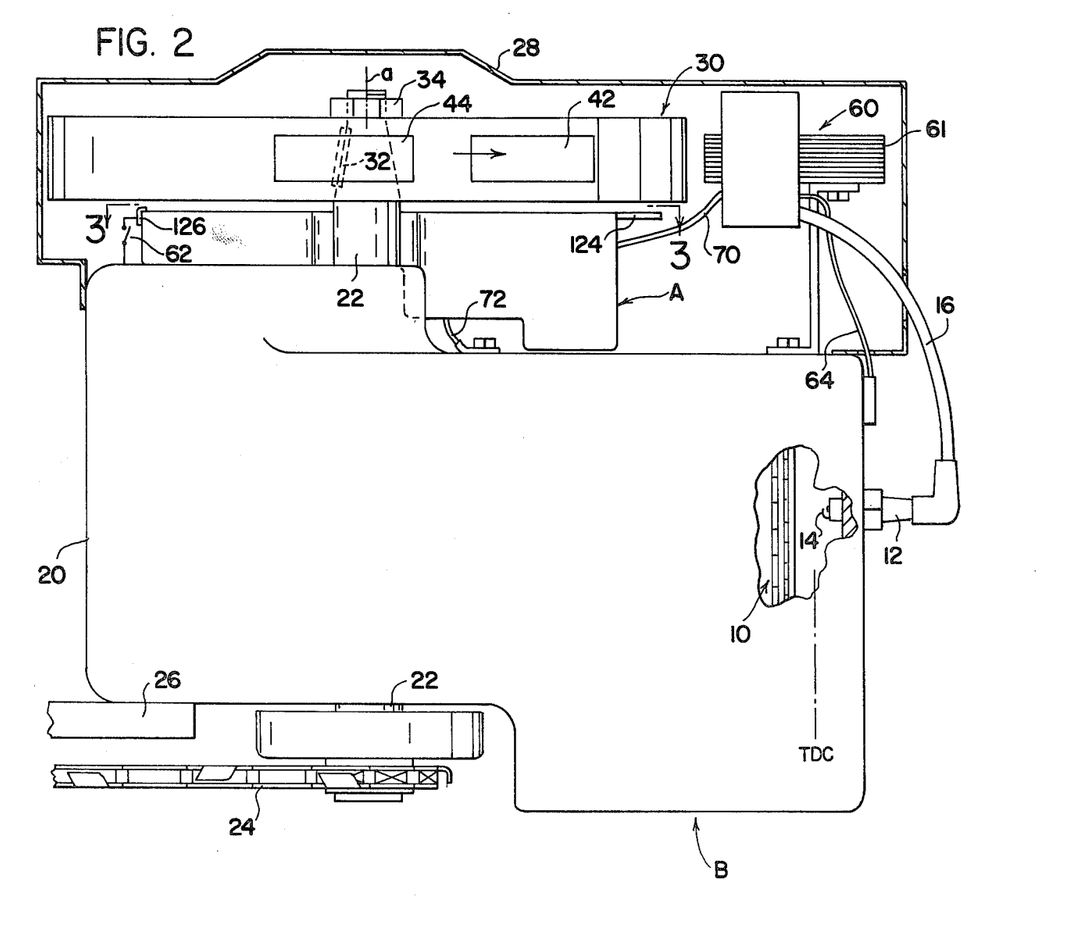
FIG. 2 is a partially cross-sectioned, partial view illustrating a power saw incorporating the preferred embodiment of one aspect of the present invention and using the cartridge, as shown in FIG. 1.

Referring now more particularly to FIGS. 1-8, an attachment or cartridge A is used for a magneto ignition system of the typed used in driving an implement, such as chain saw B, best shown in FIG. 2. This chain saw includes an internal combustion engine having a piston 10, a spark plug 12 with electrodes, one of which is shown as electrode 14, and an ignition wire 16 for directing a sparking voltage from the ignition system to the electrodes of spark plug 12. The illustrated embodiment of the invention includes housing 20 having a drive shaft 22 coupled to the crankshaft of the internal combustion engine and a chain 24 driven along a chain support 26. A cover 28 provides protection for a flywheel 30 having a key 32 and supported on a conical end of shaft 22 by a nut 34. In accordance with normal practice, flywheel 30 is the flywheel of a magneto ignition system and includes a permanent magnet arrangement having a permanent magnet 40 with high permeability magnetic pole shoes 42, 44 from which a flux field F extends radially outwardly. This flux field from shoes 42, 44 rotates about axis a as the flywheel is driven by the crankshaft connected to piston 10. To balance the weight of the permanent magnet system, flywheel 30 is provided with a counter weight 50; however, other arrangements could be used for dynamically balancing rotatable flywheel 30.

Figure 6:
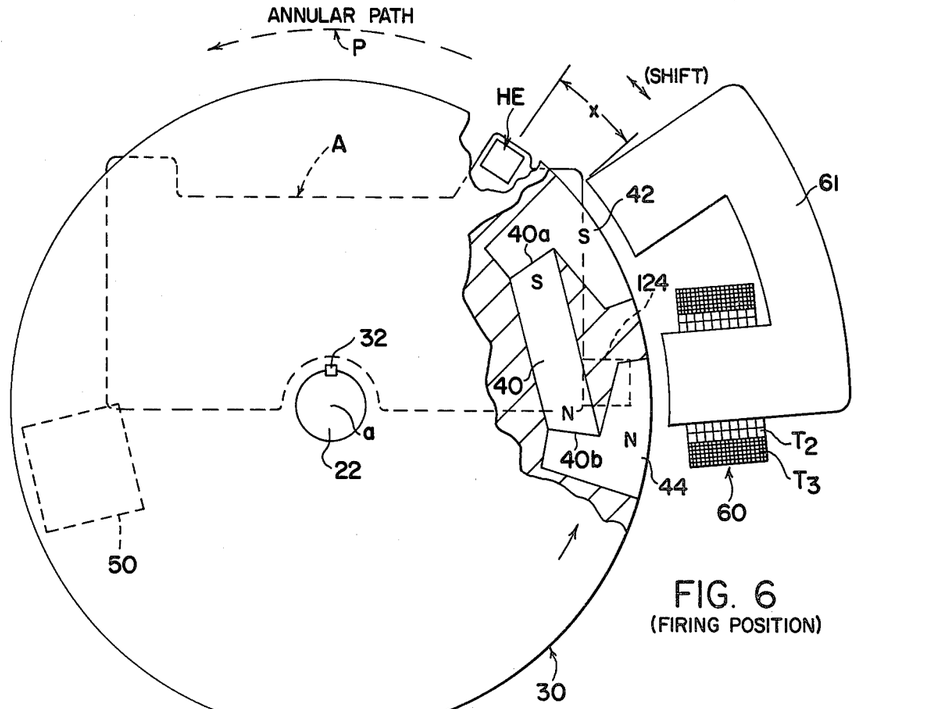
FIG. 6 is a schematic view illustrating the relationship between various components employed in the embodiment of the present invention shown in FIGS. 1-5.
Figures 18, 18A, 19, 20, 21:
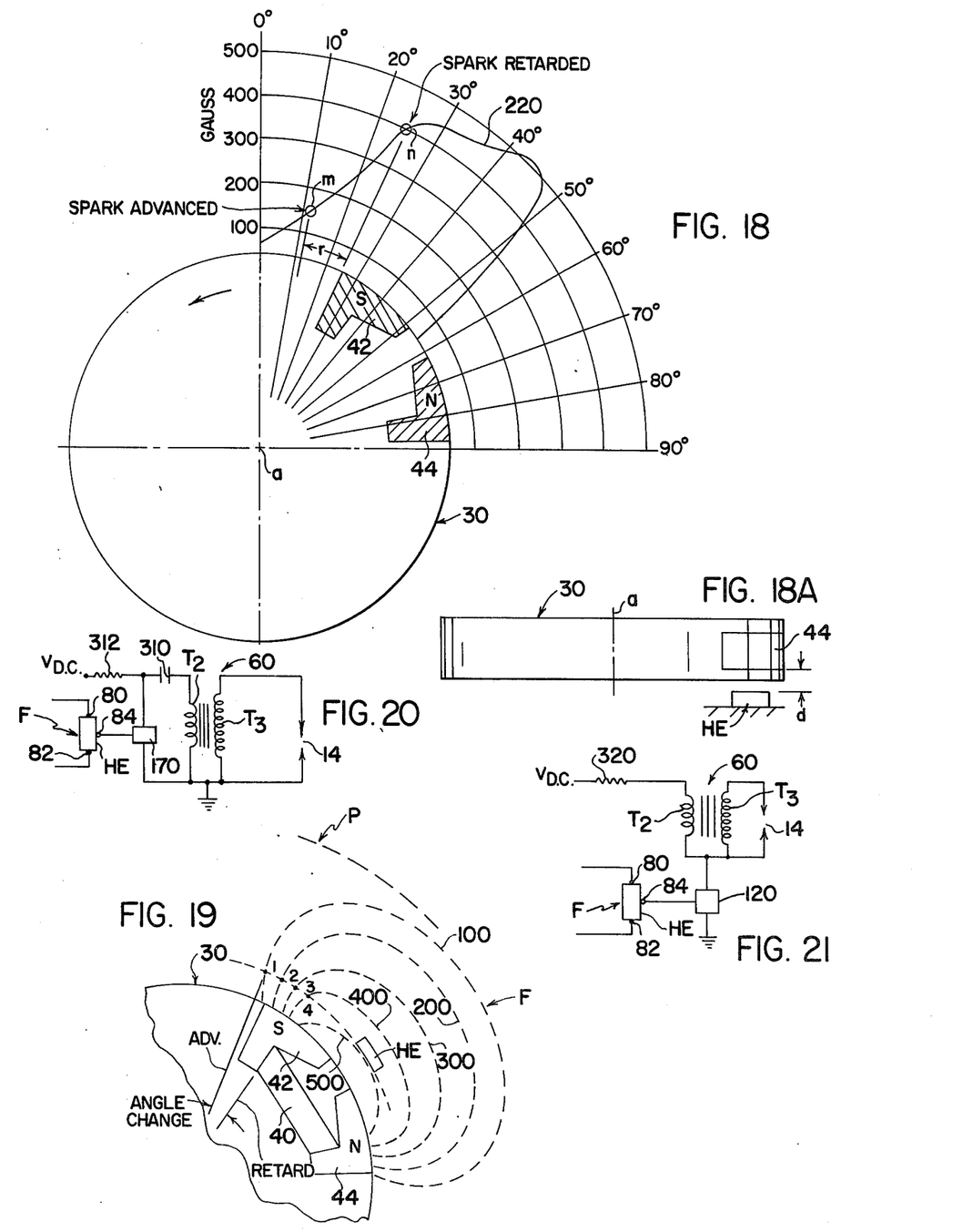

The permanent magnet system of flywheel 30, which is a somewhat standard magneto flywheel, is best shown in FIG. 6. Permanent magnet 40 has high permeability pole shoes 40a, 40b, polarized as indicated, to produce magnetic flux field F. Shoes 42, 44 are the directing elements for field F, which extends both radially outwardly and axially above and below the magnet shoes. As flywheel 30 is rotated about axis a, the outwardly extending flux field between shoes 42, 44 moves around an annular path P which path is concentric with axis a and has a generally toroidal shape extending above and below flywheel 30. Referring now to FIG. 19, the intensity of the flux field extending between pole shoes 42, 44 is graphically illustrated as flux intensity lines. As the distance from pole shoes 42, 44 increases outwardly, or vertically, there is a substantial decrease in the actual flux intensity or density. Flux field F diminishes outwardly and can be considered to be non-existent at a short distance from the pole shoes in both the radial direction and in the vertical directions. This short distance varies according to the strength of magnet 40 to give the operating features described herein.

Figure 3:
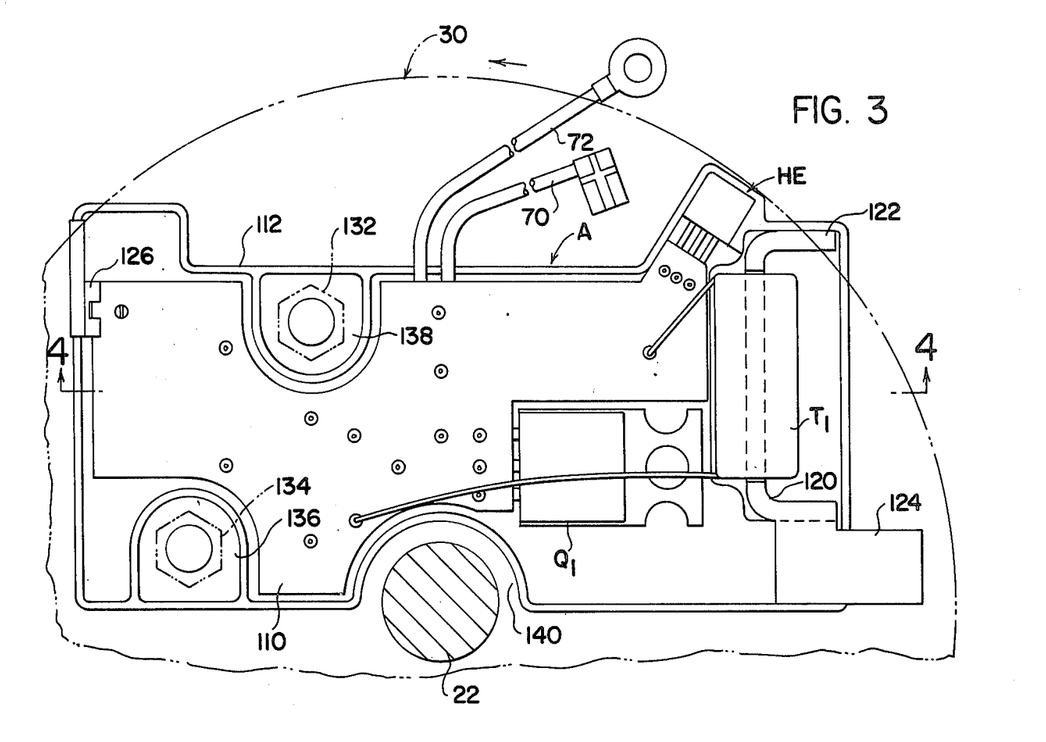
FIG. 3 is a partial top view taken generally along line 3—3 of FIG. 2 and illustrating the relationship between the flywheel of the magneto system and the cartridge, as shown in FIG. 1.
Figure 4:
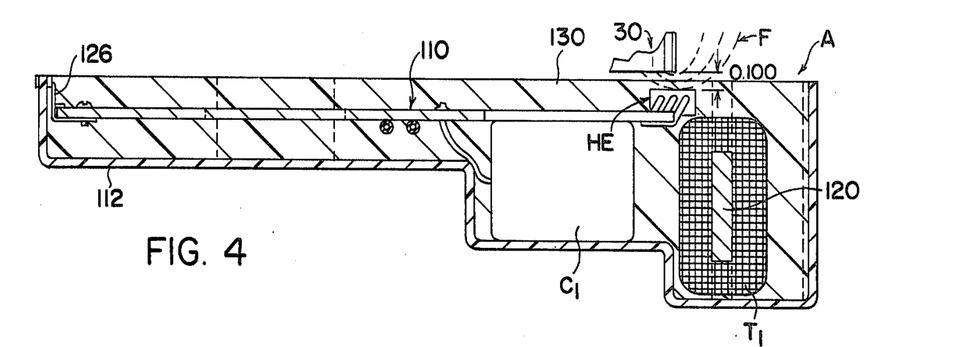
FIG. 4 is a partial cross-sectional view taken generally along line 4—4 of FIG. 3.
Figure 5:
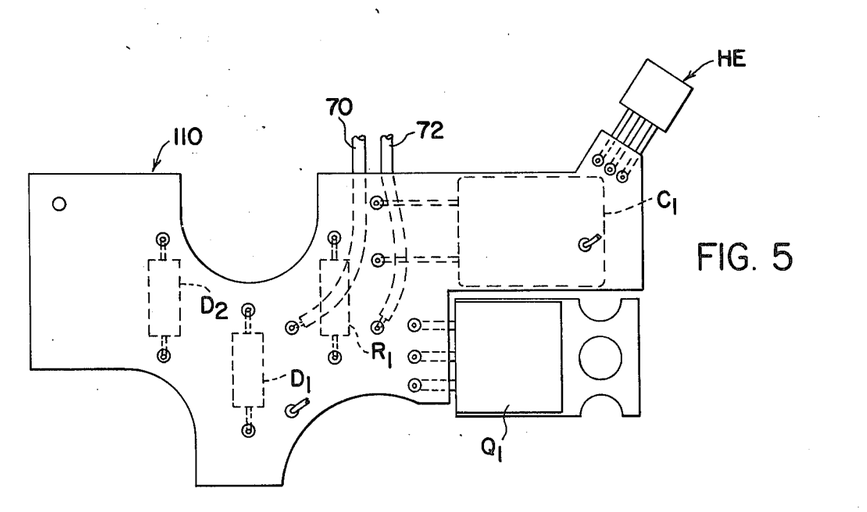
FIG. 5 is a top plan view of a printed circuit board with certain components mounted thereon as employed in the embodiment of the invention shown in FIGS. 1-4.

An ignition coil 60 of somewhat standard design includes a primary winding $T_2$ and a secondary winding $T_3$ wound about a core 61, as best shown in FIG. 6. Ignition coil 60 is a standard magneto ignition coil and flywheel 30 is also a standard magneto system component. A stop, or grounded, button switch 62 manually connects terminal 126 with grounded housing 20 to stop the internal combustion engine. Line 64 grounds coil 60. Other arrangements could be used for shorting out either the ignition coil 60 or spark plug 12 in accordance with known practice for this type of internal combustion engine. The components of the ignition system so far explained are somewhat standard components used in known magneto ignition systems. The first aspect of the present invention relates to an improvement which involves the use of the components, concepts and circuits generally incorporated in cartridge or attachment A. Referring now to FIGS. 3-5, cartridge A employs a darlington connected NPN transistor $Q_1$. This transistor has a collector line 70 coupled to one end of primary winding $T_2$ of ignition coil 60. The emitter line 72 is grounded. These basic connections are shown in FIG. 2. A Hall Effect switch HE of standard construction is provided with a positive terminal 80, a negative terminal 82 and a controlled output terminal 84 connected to the base of transistor $Q_1$. A resistor $R_1$ connects the base of transistor $Q_1$ to the positive side of biasing circuit 90 to bias transistor $Q_1$ on. As is well known, a Hall Effect switch is an integrated circuit component utilizing the Hall Effect principle to change the voltage at output 84. The Hall Effect switch is biased by a 5-20 volt D.C. biasing voltage applied across terminals 80, 82. The biasing circuit has a current rating of generally 5-20 milliamps. When a Hall Effect switch is subjected to a flux field having an intensity above a threshold point, known as the "operate point" the output 84 is toggled. This happens substantially instantaneous and requires only a few nanoseconds. In many instances, a Hall Effect switch has an input voltage regulating stage. In practice, ULS 3006T Hall Effect digital switch unit is used. This switch is distributed by Sprague Electric Company of Concord, N.H. and includes an input voltage regulator to maintain the D.C. biasing voltage substantially fixed to give a set flux operate point. FIG. 14A shows the schematic diagram of a regulated switch. Terminals 80a and 82a are directed to the regulation stage which then provides a D.C. biasing voltage across terminals 80, 82 inside the switch.

The flux operate point to toggle switch HE is determined by the D.C. biasing voltage. As the biasing voltage is increased, the threshold flux is decreased, as shown graphically in FIG. 15. Consequently, Hall Effect switch HE is actuated when exposed to a flux exceeding its operate point determined by the D.C. biasing voltage applied across terminals 80, 82. As shown in FIG. 14B, the opereate point (OP) toggles output 84 to a logic 1 as a flux is applied to the Hall cell of switch HE. As flux is removed, i.e. decreased after switching, output 84 is retoggled at a release point, RP of FIG. 14B. In practice, the operate point is used; however, the release point could be used with proper circuits.

Figure 7:
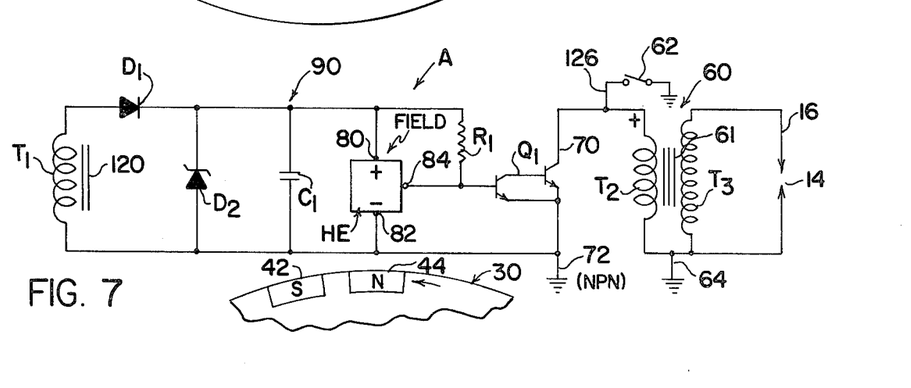
FIG. 7 is a wiring diagram of the embodiment shown in FIGS. 1-6.

To apply a biasing voltage across terminals 80, 82 when no internal regulation is used, there is provided a biasing voltage circuit 90 as shown in FIG. 7. When internal regulation is used, circuit 90 could be used as a supply voltage. Biasing circuit 90 includes a coil means $T_1$ located adjacent flywheel 30 for receiving voltage pulses as poles 42, 44 move past the coil. A rectifying diode $D_1$ and voltage limiting Zener diode $D_2$ are connected as shown in FIG. 7. In parallel with diode $D_2$ in an energy storing capacitor $C_1$ which has a capacitance sufficient to maintain a relatively constant stored voltage over the trigger angle, which voltage is limited to a level controlled by Zener diode $D_2$. The components of circuit 90, as shown in FIG. 7 are selected so that the induced voltage in coil means $T_1$ is substantially greater than the rated voltage of diode $D_2$ at higher rpms so that the diode limits D.C. voltage across terminals 80, 82 to a fixed known level. Even if circuit 90 is used only as a supply voltage, regulation is beneficial. Variations in the voltage are attenuated by the use of storage capacitor $C_1$. Components shown in FIG. 7 from lines 70, 72 are all supported on the attachment or cartridge A. This cartridge includes a circuit board 110, shown in FIG. 5, having the circuitry shown in FIG. 7 to the left of lines 70, 72, except for coil $T_1$. Circuit board 110 and coil means $T_1$ are supported by plastic housing 112, as best shown in FIGS. 3 and 4. Coil means $T_1$ has a high permeability core 120 with pole shoes 122, 124, as shown in FIG. 3. Circuit board 110 also includes a groundable connection 126 for connecting the circuitry of board 110 to the housing 20 by an alternative stop switch, like switch 62. This receptacle or housing is filled with a potting material 130 so that cartridge A is an integral component which may be bolted directly upon housing 20, as best shown in FIG. 2. Cartridge A is supported onto housing 20 by bolts 132, 134 located in recesses 136, 138, respectively. An arcuate side recess 140 allows assembly of cartridge A around shaft 22, as shown in FIGS. 2 and 3, so that the cartridge is directly below flywheel 30. In the preferred embodiment, pole shoes 122, 124 are about 0.100 inches below the lower surface of flywheel 30 and in the annular path P of flux field F so that pole pieces are intermittently subjected to the revolving flux field F. Primarily pole pieces 122, 124 are exposed to the rotating magnetic field for inducing a voltage in coil means $T_1$ to maintain a generally fixed D.C. voltage across terminals 80, 82 at the trigger point.

The large flat upper surface of Hall Effect switch HE, which carries the Hall cell, lies in a plane generally perpendicular to axis a and below flywheel 30 by a distance of about 0.100 inches, as shown in FIG. 4. Pole shoes 42, 44 are about one fourth inch above the lower surface of flywheel 30. When an attachment or cartridge A is mounted as shown in FIG. 2, the flat upper surface of Hall Effect switch HE (i.e. its internal Hall cell) is within the path P of rotating flux field F. Of course, the Hall effect switch can be located at various positions around flywheel 30 and at various spacings from pole shoes 42, 44, as long as the operate point corresponds with a sparking voltage. In a like manner, coil means $T_1$ could be located at various positions as long as it is effected by the rotating flux field F in a manner to induce a voltage sufficient to maintain a D.C. biasing voltage across terminals 80, 82 of Hall Effect switch HE or across terminals 80a, 82b when a regulated switch as shown in FIG. 14A is used.

Figure 8:
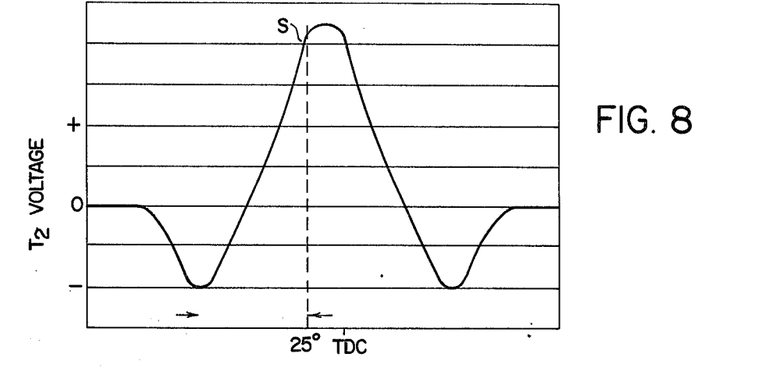
FIG. 8 is an open circuit voltage graph illustrating the induced voltage in the primary winding of the ignition coil used in the first embodiment of the present invention.

Referring now to the preferred embodiment of the invention, attachment or cartridge A is secured onto housing 20 of saw B having a crankshaft driven flywheel 30 with a magnet system for creating an induced voltage in ignition coil 60 mounted on high permeability core 61, as best shown in FIG. 6. As shaft 22 is rotated, a voltage is induced into winding $T_2$ of coil 60 as shown in FIG. 8. In the preferred embodiment, this voltage causes a corresponding current flow in winding $T_2$. Prior to top dead center (TDC) of cylinder 10, at position S which is illustrated as 25° before TDC in FIG. 8, Hall Effect switch HE is actuated to ground the base of transistor $Q_1$ into non-conduction, as shown in FIG. 7. This opens the series circuit of winding $T_2$ and transistor $Q_1$. In the preferred embodiment of the invention, Hall Effect switch HE is a current sinking Hall Effect switch so that the output 84 toggles to a logic 0 when exposed to a flux field exceeding the operate point (OP) or threshold flux, as shown in FIG. 14B. This logic 0 reverse biases transistor $Q_1$ to cause rapid collapse of the current flow in series with winding $T_2$ of ignition coil 60. This occurs at the firing point S shown in FIG. 8. The relationship of the induced voltage and the firing point is such that the rapid decrease in current induces a high voltage in secondary winding $T_3$ of ignition coil 60. This causes a spark across the electrodes of spark plug 12 to ignite the combustible materials in the cylinder of piston 10. Transistor $Q_1$ is made conductive by base current through resistor $R_1$ when switch HE has released.

In the preferred embodiment of the invention, the ignition coil 60 is positioned so that the concurrent operation of Hall Effect switch HE and high induced voltage (also induced current), as shown in FIG. 8, correspond at approximately 25° in advance of top dead center. This timing can be adjusted by shifting coil 60 or switch HE in the direction indicated by the arrows in FIG. 6 to change the angular distance X between the Hall Effect switch and the coil 60. This distance X is representative in nature and only indicates that an angular adjustment can be made between the coil 60 and Hall Effect switch HE for changing the timing of firing point S. In this embodiment, the position of the Hall Effect switch HE is fixed so that only coil 60 can be adjusted. However, in production coil 60 is generally located in the same position and only slight variations caused by manufacturing tolerances exist between the desired firing point S and the actual firing point caused by the relative position between ignition coil 60 and Hall Effect switch He both of which are controlled by the magnetic system provided on rotating flywheel 30. In a magneto type ignition system, the peak voltage occurs at a given angular position of poles 42, 44 and after assembly, firing point S remains fixed with respect to the angular position of flywheel 30. Consequently, either a regulated Hall Effect switch, such as shown in FIG. 14A, is used or a regulated external voltage from circuit 90 is applied to terminals 80, 82.

Referring now to circuit 90 for creating a D.C. biasing voltage across terminals 80, 82 of Hall Effect switch HE, this circuit is operated by the magnet system in flywheel 30. Core 120 is within the path P of the rotating flux field F created by the permanent magnet system of flywheel 30. Referring now to FIG. 7, diode $D_1$ rectifies the induced alternating voltage of coil means $T_1$ to create a D.C. voltage across capacitor $C_1$. The rating of Zener diode $D_2$ is between about 5 and 20 volts D.C. and preferably about 10–12 volts D.C. Capacitor $C_1$ and diode $D_2$ are selected to maintain a fixed D.C. voltage across terminals 80, 82. In this manner, the operate point for toggling output 84 remains constant whether or not switch HE has a regulation stage, at least during the switching or trigger point.

Although a single spark plug has been shown, two or more spark plugs each of which is controlled by a separate Hall Effect switch could employ the present invention wherein winding $T_2$, switch HE and circuit 90 are all powered by the magnetic flux field of a magneto flywheel. Also, the voltage in winding $T_2$ could be induced while the switching means, i.e. transistor $Q_1$, is opened. Then the Hall Effect switch could be used to control the solid state switching device for closing the circuit and rapidly increasing current flow within primary winding $T_2$. Both rapidly increasing and rapidly decreasing the current flow in winding $T_2$ will cause a high induced voltage within the secondary winding $T_3$ for creating a sparking gap in accordance with known ignition coil operation.

MODIFICATION OF THE FIRST PREFERRED EMBODIMENT

Figure 9:
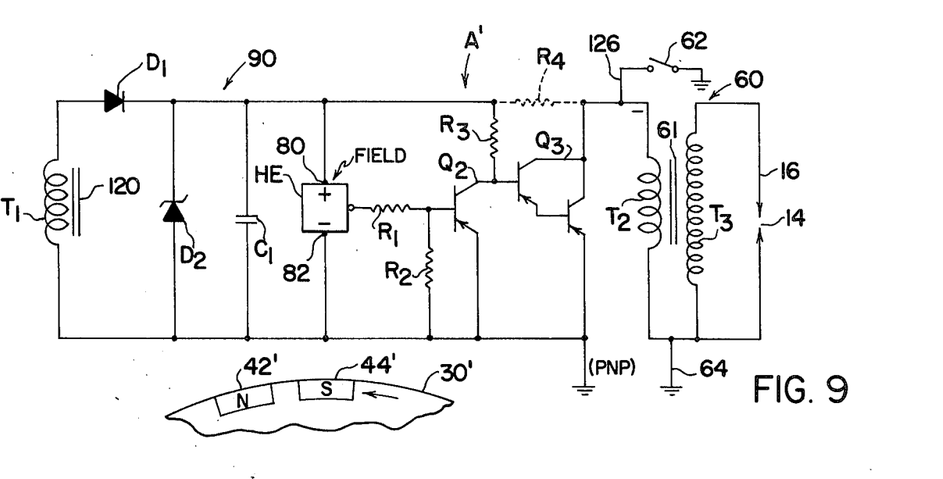
FIG. 9 is a wiring diagram similar to that shown in FIG. 7 employing different polarities and a different type of PNP transistor switching arrangement.
Figure 10:
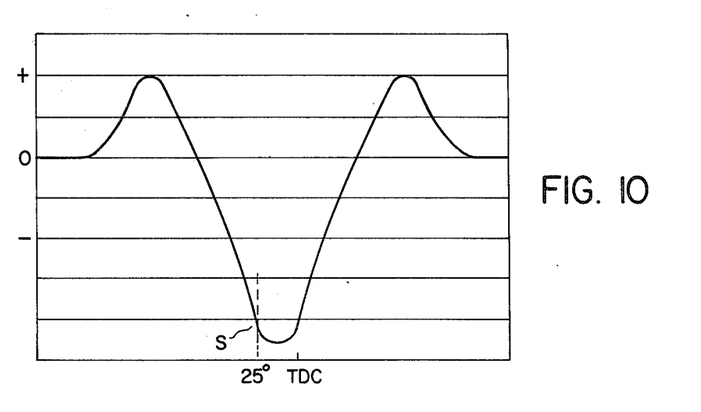
FIG. 10 is a voltage graph similar to that shown in FIG. 8 for the circuits illustrated in FIG. 9.

Referring now to FIGS. 9 and 10, cartridge A' has basically the same structural features as cartridge A of the preferred embodiment. This second cartridge is designed to use a PNP transistor switching means between the Hall Effect switch HE and ignition coil 60. Attachment A' employs a first PNP transistor $Q_2$ which is normally reversed biased by a logic 1 at output 84. A darlington connected PNP amplifying transistor $Q_3$ has a base connected to the collector of transistor $Q_2$ and also to resistor $R_3$ to the positive side of charging circuit 90. Resistor $R_2$ is connected emitter to base of transistor $Q_2$. This modification may be used when the flywheel is rotating with an opposite polarity magnetic pole in the leading position. As shown in FIG. 9, flywheel 30' has a north magnetic pole shoe 42' in the leading position. The trailing magnetic pole shoe 44' is a south magnetic pole. This is opposite to the polarity of flywheel 30 illustrated in the preferred embodiment of the invention as shown in FIG. 7. Of course, the same arrangement could be obtainable by reversing the direction of rotation of flywheel 30 as shown in FIG. 7. Thus, the type of circuit employed can be changed according to the polarity of the induced voltage within primary winding $T_2$ of ignition coil 60. As shown in FIG. 10, the induced voltage has an opposite polarity because of the change in magnetic polarity. The types of polarity and the type of switching arrangement used can be modified without changing the basic concepts of the present invention. Thus, cartridge A or cartridge A' may be used according to the existing conditions of the ignition system which is to be modified by use of a replaceable cartridge.

In operation of the modifications shown in FIGS. 9 and 10, transistor $Q_2$ is normally reverse biased. During the negative lobe of induced voltage in winding $T_2$, transistor $Q_3$ is forward biased and conducting. Base current is supplied by resistor $R_3$. The current flow in the series circuit including transistor $Q_3$ and winding $T_2$ generally follows the open voltage wave form shown in FIG. 10. When Hall Effect switch HE is toggled, a low voltage appears at the base of transistor $Q_2$. This forward biases transistor $Q_2$ through resistor $R_2$ and reverse biases transistor $Q_3$. Thus, $Q_3$ is immediately turned off and the current flow in series circuit including winding $T_2$ is interrupted immediately. This causes a rapid collapse of the high current. High voltage is induced within primary $T_3$. Consequently, a spark voltage is created across electrodes 14 of spark plug 12 as explained in the preferred embodiment of the invention.

It is possible to employ a resistor $R_4$ as shown in dashed lines in FIG. 9. In this manner, resistor $R_3$ is used to turn on transistor $Q_3$ during the negative lobe of the voltage as shown in FIG. 10. This turn on of the transistor allows current to flow in winding $T_2$ only during high voltages across transistor $Q_3$. Of course, other circuits could be used for accomplishing the purposes of the present invention.

Figure 11:
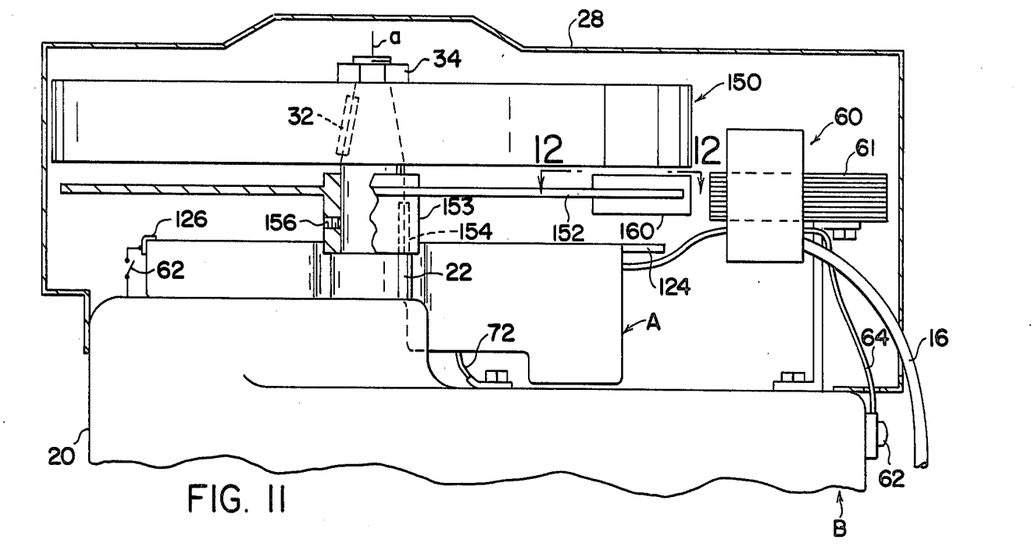
FIG. 11 is a partial side elevational view showing a modification of the first embodiment of the invention.
Figure 12:
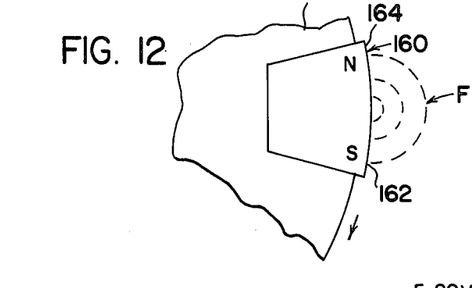
FIG. 12 is a partial view taken generally along line 12—12 of FIG. 11.

Referring now to FIGS. 11 and 12 a further modification of the preferred embodiment is illustrated. In FIG. 11, components used in FIG. 1 have the same numbers. In this embodiment, flywheel 150 does not include a permanent magnet arrangement. A generally circular plate 152 is mounted by hub 153 onto shaft 22. A key 154 and a set screw 156 locks plate 152 in the proper axial position on shaft 22. This plate carries a permanent magent 160 having outwardly facing magnetized poles 162, 164. Of course, the magnetic structure shown in FIG. 6 could be employed wherein a permanent magnet is provided with outwardly extending pole shoes. The operation of the embodiment shown in FIGS. 11 and 12 is the same as the preferred embodiment with the exception that the flywheel does not carry the rotating flux field used in operating the solid state ignition system.

Figure 13:
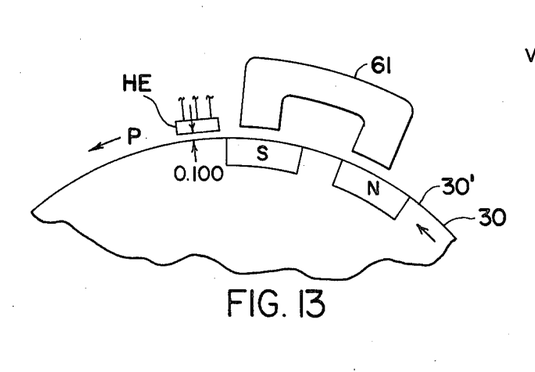
FIG. 13 is a schematic view showing a modification of the relationship between the Hall Effect switch and the flyweel used in the first preferred embodiment of the present invention.

Referring now to FIG. 13, a further modification of the preferred embodiment is illustrated. In this figure, the Hall Effect switch HE has its flat facing surface positioned radially outwardly approximately 0.100–0.200 inches from the outer periphery 30' of flywheel 30. In this manner, the rotating flux field F moves in annular path P and intersects and operates the Hall Effect switch from a peripheral position. The use of the axially spaced concept of the preferred embodiment assists in mounting the Hall Effect transistor in a replaceable cartridge A. Also, the space available in the existing magneto ignition systems is more conducive to the placement of the Hall Effect switch as in the preferred embodiment of the invention. The spacing shown in FIG. 4 is between the bottom part of the flywheel and the upper flat surface of Hall Effect switch HE. In that embodiment, the spacing is approximately 0.100 inches which renders the spacing between the magnet itself somewhat larger than 0.100 inches. In practice, the spacing between the lower part of the magnet in the preferred embodiment shown in FIG. 4 and the upper surface of Hall Effect switch can be in the general range of 0.150 to 0.500 inches. The spacing is not extremely critical in that various spacings could be provided for varying the switching point of the Hall Effect switch.

Figure 14:
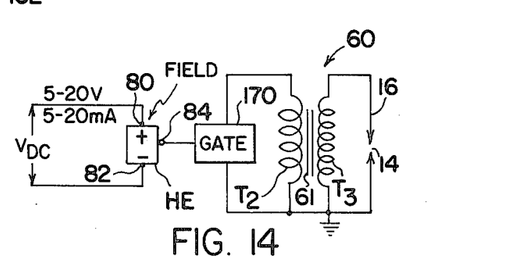
FIG. 14 is a simplified schematic diagram of the firing circuit used in the first preferred embodiment of the present invention.
Figure 14A:
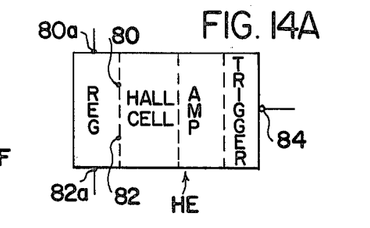
FIG. 14A is a schematic diagram of the components of a Hall Effect switch which is used in practice of the invention.
Figure 14B:
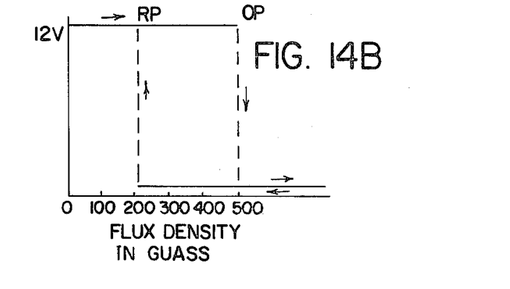
FIG. 14B is a hysteresis curve of the switch shown in FIG. 14A.

Referring now to FIG. 14, a schematic illustration of the embodiments of the invention is set forth wherein the Hall Effect of switch HE is shown as operating a gate 170 connected to the ignition coil 60. The D.C. biasing voltage across terminals 80, 82 is a fixed voltage of between 5 volts and 20 volts D.C. and has a current rating of between 5 milliamps to 20 milliamps. A regulated Hall Effect can be used. A battery could be provided for creating the D.C. source in certain instances; however, the use of the magneto induced voltage is preferred in that no replaceable battery supply is needed. This is an extremely beneficial feature of a mobile internal combustion driven implement using a magneto ignition system.

SPEED RESPONSIVE MODIFICATION

Figure 15:
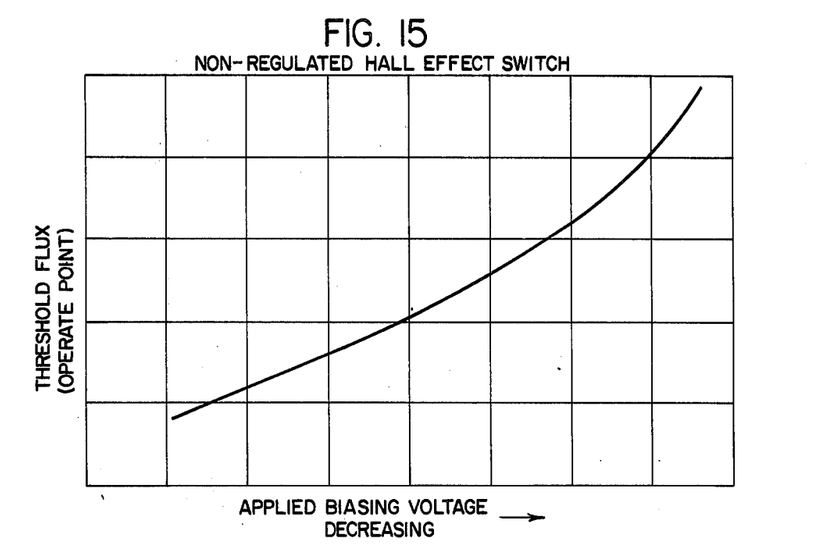
FIG. 15 is a graph illustrating the change in threshold flux of a Hall Effect switch with respect to different biasing voltages which is a physical property employed in the second aspect of the present invention.
Figure 16:
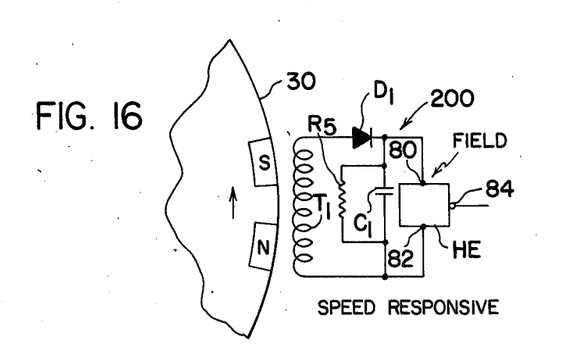
FIGS. 16 and 17 are schematic illustrations of circuits for providing a variable D.C. biasing voltage for the Hall Effect switch employed in the present invention.

As is well known, internal combustion engines of the type used in hand or mobile implements are operable at various speeds. The speed may vary substantially. At higher speeds, it is often advantageous to advance the firing position of the spark with respect to top dead center (TDC) of the piston. FIGS. 15–19 disclose an arrangement for accomplishing this function in a solid state ignition system using a Hall Effect switch. This concept can be employed in limited situations in the first concept of the invention; however, this feature of the invention is primarily useful in an ignition system of the discharge type which can change the firing position in accordance with the speed of the internal combustion engine. This second feature employs the property of a non-regulated Hall Effect switch, as shown in FIG. 15. As the applied voltage is decreased, the operate point or threshold flux increases. Thus, a lower D.C. biasing voltage applied to the switch requires a higher flux density for operating the switch. This concept is employed by providing a biasing circuit which is speed responsive to a Hall Effect switch having linear characteristics as shown in FIG. 15. This characteristic is inherent in the Hall cell; however, in commercial switches using the Hall cell, the biasing voltage is often clamped to a fixed level to fix the operate point. A speed responsive biasing circuit is illustrated in FIG. 16 wherein the charging circuit 200 includes winding $T_1$, rectifying diode $D_1$ and capacitor $C_1$. Resistor $R_5$ has a high value to assure that the stored voltage on capacitor $C_1$ is directly proportional to the speed of flywheel 30. As the rotational speed of flywheel 30 increases, the D.C. voltage on capacitor $C_1$ increases. Thus, the biasing voltage is increased and the threshold flux of operate point of Hall Effect switch HE is decreased. It may be possible to employ a device other than capacitor $C_1$ and/or resistor $R_5$ to follow the variations in speed of flywheel 30. Other charging circuits could be employed for providing a D.C. biasing voltage proportionate to the velocity of flywheel 30.

Figure 17:
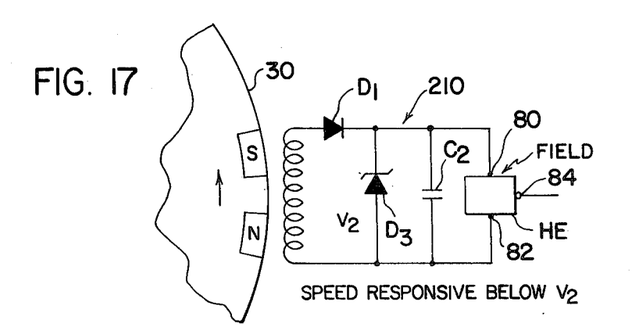

In FIG. 17, a Zener diode $D_3$ and a capacitor $C_2$ are connected in parallel in a charging circuit 210. The Zener diode has a voltage rating of $V_2$. Thus, for voltages less than $V_2$ the charging circuit is speed responsive. This produces a variation in the firing point to a selected increased velocity determined by a voltage rating of Zener diode $D_3$. Biasing circuits shown in FIGS. 16 and 17 are speed responsive as opposed to a fixed type of biasing circuit employed in the preferred embodiment of the invention by either a regulated supply or a regulated input stage for the Hall Effect switch. This concept of using a Hall Effect transistor for advancing the spark in accordance with speed of the engine can best be used in a capacitive and inductive discharge type ignition system as shown in FIGS. 20 and 21, respectively. The Hall Effect switch is used in a discharge type of ignition system to discharge current in the primary circuit for causing a rapid increase in current flow in the primary winding and thus creating a sparking voltage in the secondary winding.

Referring now to FIG. 18, the operating characteristic of the speed responsive advance feature previously described is illustrated. Line 220 is a constructed line illustrating the point at which Hall Effect switch HE is operated with respect to the angular position of flywheel 30 at various threshold flux magnitudes. For instance, if the threshold flux magnitude is approximately 150 Gauss, Hall Effect switch HE will be operated at angular point m. If the threshold flux is 400 Gauss, the Hall Effect switch will be operated at angular point n. Thus, by shifting the operate point of threshold flux between 150 and 400 Gauss, the sparking point can be changed through the angle r. This shows the ability of changing the spark advance position with respect to flywheel 30 by changing the threshold flux of Hall Effect switch HE. This change in flux can be accomplished by changing the biasing voltage as previously described. FIG. 18A is shown to indicate that FIG. 18 is for a fixed location of Hall Effect switch HE. This distance is indicated as d. The spacing of the Hall Effect switch would modify the profile of line 220.

Referring now to FIG. 19, another illustration is provided for the speed responsive effect. Flux density or intensity of the flux field F extending between pole shoes 42, 44 varies according to outward spacing from the poles. If the threshold flux of Hall Effect switch HE is adjusted by the D.C. biasing voltage to 100 Gauss, ignition will occur at point (1). If threshold flux is increased by decreasing the D.C. biasing voltage, the firing point progresses between point (2), (3) and (4). In the graphic illustration of FIG. 19, the threshold flux can not be increased substantially above 500 Gauss since the Hall Effect switch HE will not be subjected to such a high flux level. FIGS. 18 and 19 clearly illustrate the technical characteristics and principles used in the speed responsive modification or control of the sparking position of a solid state ignition system using a Hall Effect switch.

As stated previously, the spark advance and retard feature is best applicable to a discharge ignition system wherein stored electrical energy is discharged through the primary winding $T_2$ of an ignition coil 60. Two representative discharge systems are schematically represented in FIGS. 20 and 21. In FIG. 20, coil 60 is mounted away from direct induced influence by the magnetic field F. Capacitor 310 is charged by a D.C. supply $V_{D.C.}$ through resistor 312. Consequently, stored electrical energy is available for discharge at various angular positions of the flywheel, i.e. the rotating flux field F. At the operate point of switch HE, as controlled by a speed variable bias across terminals 80, 82, switching means 170 is closed. This discharges capacitor 310 through winding $T_2$ and sparks electrodes 14. Changes in the voltage across terminals 80, 82 changes the relative position of the spark.

An inductive discharge system is schematically illustrated in FIG. 21. A D.C. source of about 9–12 volts stores energy in winding $T_2$. When Hall Effect switch HE is toggled by the rotating field, switching means 170 is opened and the flux field of winding $T_2$ collapses. This causes a high voltage in winding $T_3$ due to the step-up turns ratio between windings $T_2$, $T_3$. Again, ignition coil 60 is not energized directly by the rotating flux field as in the circuit of FIG. 20. Resistor 320 limits current flow to the power supply.

Having thus described the invention, it is claimed:

1. In an ignition system including a member rotatable about an axis in unison with the crankshaft of an internal combustion engine, a single permanent magnet having an outwardly extending magnetic flux field and carried by said member to create a flux field rotating in a given annular path concentric with said axis, said flux field having a given flux intensity at a selected location spaced from said member and in said path when said member is in a selected angular position, a circuit for creating a sparking voltage upon a rapid change in current in at least a portion of said circuit, and switching means for causing said rapid change in current upon actuation thereof, the improvement comprising: a Hall Effect switch activated by a D.C. biasing voltage and having a switchable output and an operate point flux above which said switchable output is shifted from a first electrical condition to a second electrical condition, said operate point flux corresponding to said given flux intensity; means for actuating said switching means by said second electrical condition; coil means for creating said D.C. biasing voltage upon exposure to said magnetic flux field; first mounting means for mounting said coil means adjacent said member and in said path whereby said flux field causes said coil means to create said biasing voltage; second mounting means for mounting said Hall Effect switch in said path and at said selected location; a common support structure for supporting said first and second mounting means in fixed spatial relationship; and means for releasably securing said common support structure with respect to said rotatable member.

2. The improvement as defined in claim 1 wherein said switching means is a transistor switch and including means for mounting said transistor switch on said common support member.

3. The improvement as defined in claim 1 wherein said sparking voltage creating circuit includes a transformer having first and second windings and means separate from said common support structure for mounting said transformer with at least said first winding in said path whereby a voltage is induced into said first winding when said flux field moves past said first winding, said voltage having a spark creating level when said member is in said selected position.

4. The improvement as defined in claim 3 including means in said circuit for connecting said first winding and said switching means in an electrical series circuit.

5. The improvement as defined in claim 1 wherein actuation of said switching means by said Hall Effect switch opens said electrical series circuit.

6. The improvement as defined in claim 1 wherein said coil means is included in a biasing circuit for providing said D.C. biasing voltage, said biasing circuit including output leads connected to said Hall Effect switch and a rectifier means.

7. The improvement as defined in claim 6 wherein said biasing circuit includes voltage control means for maintaining said D.C. biasing voltage at a fixed D.C. level during variations of voltage induced into said coil means.

8. The improvement as defined in claim 6 wherein said biasing circuit includes means for varying said D.C. biasing voltage with variations of the rotational velocity of said rotatable member.

9. An attachment for the magneto ignition system of an internal combustion engine having a spark plug, a transformer with first and second windings, the second of which is connected across said spark plug and a rotating single permanent magnet means having a flux field for inducing a spark creating voltage in said first winding, said attachment comprising: means for fixedly securing said attachment adjacent said rotating member; a Hall Effect switch activated by a D.C. biasing voltage and having a switchable output and an operate point flux above which said switchable output is shifted from a first electrical condition to a second electrical condition, solid-state switching means for causing a rapid change in current in said first winding when said switching means is actuated, coil means for creating said D.C. biasing voltage upon exposure to a flux field, means on said attachment for supporting said coil adjacent to said rotating permanent magnet for actuation by said flux field and means on said attachment for mounting said Hall Effect switch in a selected location adjacent to said rotating permanent magnet for switching by said flux field in timed relationship with said spark creating voltage in said second winding.

10. An attachment as defined in claim 9 wherein said selected location is spaced axially from said rotating member.

11. An attachment as defined in claim 9 wherein said coil means is included in a biasing circuit on said attachment for providing said D.C. biasing voltage, said biasing circuit including output leads connected to said Hall Effect switch and a rectifier means.

12. An attachment as defined in claim 11 wherein said biasing circuit includes voltage control means for maintaining said D.C. biasing voltage at a fixed D.C. level during variations of voltage induced into said coil means.

13. An attachment as defined in claim 12 wherein said voltage control means includes a capacitor, means for connecting said capacitor across said output leads and a voltage control element in electrical parallel with said capacitor.

14. In an ignition system for an internal combustion engine having a crankshaft, said system including a member rotatable about an axis in unison with said crankshaft, a single permanent magnet having an outwardly extending flux field and carried by said member to create a flux field rotating in a given annular path concentric with said axis, a circuit for creating a sparking voltage upon a rapid change in current in at least a portion of said circuit, said circuit including means for storing electrical energy and switching means for causing said rapid change in current caused by said stored energy upon actuation thereof; the improvement comprising: said switching means including a solid state device and means for actuating said device upon receipt of a firing signal, a non-regulated Hall Effect switch activated by a flux field of an intensity determined by a D.C. biasing voltage across said switch and having a switchable output means shiftable from a second condition to a first condition upon actuation of said switch for directing said firing signal to said solid state device when said switch output is in said first shifted condition; means for mounting said Hall Effect switch in a selected location in said path for switching said output to said first condition when said rotatable member is at a given angular position, a capacitor means for controlling said D.C. biasing voltage and connected across said switch; and, a coil means fixedly mounted in said path for creating the D.C. biasing voltage for said Hall Effect switch by charging said capacitor to a biasing voltage representing the speed of said rotating flux field.

15. In an ignition system including a member rotatable about an axis, a single permanent magnet having an outwardly extending flux field and carried by said member to create a flux field rotating in a given annular path concentric with said axis, capacitor means for storing electrical energy, at least one spark gap, a transformer with a first winding and a second winding, means for connecting said first winding in series with said spark gap, and switching means for discharging said stored energy through said second winding upon actuation of said switching means, the improvement comprising: said switching means including a solid state device and means for actuating said device upon receipt of a firing signal, a non-regulated Hall Effect switch activated by a flux field of an intensity determined by a D.C. biasing voltage across said switch and having a switchable output means shiftable from a second condition to a first condition upon actuation of said switch for directing said firing signal to said solid state device when said switch output is in said first condition, means for mounting said Hall Effect switch in a selected location in said path for switching said output to said first condition when said rotatable member is at a given angular position, and coil means in said path for varying said D.C. biasing voltage of said Hall Effect switch with variations of the rotational velocity of said rotatable member.

16. A solid state ignition system for creating a sparking voltage across the electrodes of a spark plug, said system comprising a member rotatable about an axis; a single permanent magnet having an outwardly extending flux field and carried by said member to create a flux field rotating in a given annular path concentric with said axis, a transformer with a first winding and a second winding; means for connecting said first winding in series with said spark gap; means for mounting said second coil with relation to said path for inducing a sparking current flow in said second winding at a selected angular position of said member; a Hall Effect switch having a selected output condition when subjected to a magnetic flux field and a selected D.C. biasing voltage; control means for directing a voltage at least equal to said selected D.C. biasing voltage to said switch; means for interrupting current flow in said second winding in response to said selected output condition; means for mounting said switch in said path for subjecting said switch to said flux field at said selected angular position; and, said control means includes a coil means and means for mounting said coil means in said path for induction of a voltage at least equal to said selected D.C. biasing voltage in said coil means.

* * * * *

UNITED STATES PATENT AND TRADEMARK OFFICE
CERTIFICATE OF CORRECTION

PATENT NO. : 4,155,340

DATED : May 22, 1979

INVENTOR(S) : James F. Fernquist, James C. Byrne

It is certified that error appears in the above-identified patent and that said Letters Patent are hereby corrected as shown below:

In the drawings, Sheet 5, FIG. 14B, "GUASS" should read -- GAUSS --; Sheet 7, FIG. 21, reference numeral 120 should read -- 170 --. Column 2, line 38, "provided" should read -- provides --. Column 3, line 53, "a" should read -- an --. Column 5, line 8, "schematic graph" should read -- view --; line 26, "typed" should read -- type --. Column 6, line 21, "Referring" should start a new paragraph; line 31, delete "on"; line 39, after "operate point" insert a comma (,); line 59, "opereate" should read -- operate --. Column 7, line 5, "in" (last occurrence) should read -- is --; line 39, after "that" insert -- the --; line 58, "effected" should read -- affected --. Column 8, line 39, after "production" insert a comma (,). Column 10, line 52, delete "of"; line 57, after "Effect" insert -- switch --. Column 13, line 34, "claim 1" should read -- claim 4 --.

Signed and Sealed this

Seventh Day of April 1981

[SEAL]

Attest:

RENE D. TEGTMEYER

*Attesting Officer*  *Acting Commissioner of Patents and Trademarks*